United States Patent [19]

Vesley

[11] Patent Number: 4,748,061
[45] Date of Patent: May 31, 1988

[54] CAMOUFLAGED COMPOSITE PRESSURE-SENSITIVE ADHESIVE TAPE

[75] Inventor: George F. Vesley, Hudson, Wis.

[73] Assignee: Minnesota Mining and Manufacturing Company, St. Paul, Minn.

[21] Appl. No.: 242

[22] Filed: Jan. 2, 1987

[51] Int. Cl.$^4$ .............................................. C08F 2/48
[52] U.S. Cl. .................................... 428/40; 427/54.1; 427/402; 428/325; 428/355; 428/402; 428/906; 428/919
[58] Field of Search .................. 428/40, 325, 355, 402, 428/906, 919; 427/54.1, 402

[56] References Cited

U.S. PATENT DOCUMENTS

| | | | |
|---|---|---|---|
| Re. 24,906 | 12/1960 | Ulrich | 428/480 X |
| 4,181,752 | 1/1980 | Martens et al. | 427/54.1 |
| 4,223,067 | 9/1980 | Levens | 428/338 X |
| 4,287,308 | 9/1981 | Nakayama et al. | 521/53 |
| 4,329,384 | 5/1982 | Vesley et al. | 428/345 X |
| 4,330,590 | 5/1982 | Vesley | 428/345 X |
| 4,364,972 | 12/1982 | Moon | 427/54.1 |
| 4,415,615 | 11/1983 | Esmay et al. | 428/40 |
| 4,421,822 | 12/1983 | Levens | 428/345 X |
| 4,513,039 | 4/1985 | Esmay | 428/345 X |
| 4,522,870 | 6/1985 | Esmay | 428/345 X |
| 4,612,242 | 9/1986 | Vesley et al. | 428/317.5 X |
| 4,615,472 | 10/1986 | Nash | 226/127 |
| 4,666,771 | 5/1987 | Vesley et al. | 428/40 X |

*Primary Examiner*—Henry F. Epstein
*Attorney, Agent, or Firm*—Donald M. Sell; James A. Smith; Darla P. Neaveill

[57] ABSTRACT

A pressure-sensitive adhesive tape having a camouflaged appearance has a cellular of foamlike pressure-sensitive core layer and at least one relatively thin, dense, pigmented pressure-sensitive adhesive surface layer. The thickness of the core layer may be about 0.1 mm and that of a surface layer about 0.03 mm. The surface layer of such a composite tape appears to be more intense in color than does either the core layer or the surface layer by itself. When viewed edgewise, the composite tape appears to present a color that is more intense than one would expect from viewing the edges of the core layer and surface layer by themselves.

13 Claims, No Drawings

CAMOUFLAGED COMPOSITE PRESSURE-SENSITIVE ADHESIVE TAPE

CROSS REFERENCE TO RELATED PATENT

The present invention concerns the same problem as that to which U.S. Pat. No. 4,612,242 is directed. Teachings in that patent about microbubbles and about pressure-sensitive adhesives and their photopolymerization are incorporated here by reference.

BACKGROUND OF THE INVENTION

1. Field of the Invention

The invention concerns pressure-sensitive adhesive tape, an adhesive layer of which either is foamlike because it includes glass microbubbles as taught in U.S. Pat. No. 4,223,067 or comprises a foam because it has a cellular core as taught in U.S. Pat. No. 4,415,615.

2. Description of the Related Art

Foam-backed pressure-sensitive adhesive tape is commonly used to adhere an article to a substrate. The foam backings of such tapes often are pigmented with carbon black to afford a dark appearance that camouflages their presence.

The pressure-sensitive adhesive tape of the above-cited U.S. Pat. No 4,223,067 has a foamlike appearance and character, even though it is not a foam, and is useful for purposes previously requiring a foam-backed pressure-sensitive adhesive tape. A foamlike tape of this type now on the market is made by ultraviolet light polymerization of a layer of an adhesive-forming mixture containing colorless glass microbubbles, which act as a white pigment that makes the tape undesirably visible in uses such as sealing a skylight or attaching body side moldings to automotive vehicles or simulated mullion bars to glass windows. Because of its superior performance characteristics, this foamlike tape is often preferred to foam-backed tapes for such purposes and would be more acceptable if its adhesive layer were sufficiently dark to camouflage the tape. If carbon black or other pigment were added to the photopolymerizable adhesive-forming mixture in amounts sufficient to produce a desirably dark appearance, this would block the ultraviolet radiation from polymerizing the mixture to a pressure-sensitive adhesive state. Up to about 0.06 percent by weight of carbon black can be employed without undue interference with the polymerization of a 1.0-mm layer (as evidenced by adhesive and cohesive values), but such small amounts produce only a pastel grey color that would be undesirably noticeable for uses such as those mentioned above. When other pigments are substituted for the carbon black, they also cannot be used in amounts producing a color deeper than pastel.

Although the microbubbles disclosed in the U.S. Pat. No. 4,223,067 examples are glass, they can be polymeric of the type described in U.S. Pat. No. 4,615,472 or U.S. Pat. No. 4,287,308. Because these polymeric microbubbles are smaller and less dense than commercially available glass microbubbles, a larger number is required to attain the same volume loading of microbubbles. Hence, pigmented foamlike tapes tend to be even lighter colored when filled with polymeric microbubbles than when filled with glass microbubbles.

Also useful for purposes previously requiring a foam-backed pressure-sensitive adhesive tape is the cellular pressure-sensitive adhesive tape disclosed in U.S. Pat. No. 4,415,615. It preferably is made by polymerizing a coated froth in situ by exposure to ultraviolet radiation. Although the use of pigments is suggested (col. 5, lines 48–57), the ultraviolet radiation would be blocked if the froth contained appreciable amounts of carbon black or other pigment.

The above-cited U.S. Pat. No. 4,223,067 also teaches that where it is desired to adhere the microbubble-filled tape to a surface to which its pressure-sensitive adhesive layer would not form a strong bond, it may be desirable to apply to one or both of its faces a layer of unfilled pressure-sensitive adhesive which is especially selected for its adhesion to that surface (col. 4, lines 9–15). The above-cited U.S. Pat. No. 4,416,615 contains a similar teaching (col. 5, lines 3–9).

DISCLOSURE OF INVENTION

Brief Summary of the Invention

The invention provides a pressure-sensitive adhesive tape, the adhesive layer of which can either be filled with microbubbles as in the tape of U.S. Pat. No. 4,223,067 or have a cellular pressure-sensitive adhesive layer like that of the above-cited Esmay patent, and yet can present a sufficiently dark appearance to meet the needs mentioned above.

This combination of desirable properties is achieved by a composite pressure-sensitive adhesive tape comprising a microbubble-filled or cellular pressure-sensitive adhesive core layer to which is adhered a relatively thin surface layer comprising pigmented pressure-sensitive adhesive that is substantially free from microbubbles. Preferably the core layer comprises at least 90% of the thickness of the pressure-sensitive adhesive composite. When the same pigment is used in both the core and surface layers, the broad face of the surface layer of the novel composite tape has a more intense color than does the face of either layer by itself. Also surprising is that the edge of the novel composite tape appears to present a more intense color than one would expect from viewing the edge of the core layer by itself. Both the face and edge of the novel composite tape appear to have a more intense color than does the core layer by itself even when both the surface and core layers have been loaded to about the same proportion of pigment relative to the amount of pressure-sensitive adhesive.

Hence, the invention makes it feasible to produce by photopolymerization either a microbubble-filled pressure-sensitive adhesive tape like that of U.S. Pat. No. 4,223,067 or a cellular pressure-sensitive adhesive tape like that of U.S. Pat. No. 4,415,615 and to afford that tape a dark or colored appearance sufficient to camouflage it in uses such as for mounting automotive body side molding or simulated mullion bars or for sealing skylights. When the novel tape has a microbubble-filled pressure-sensitive adhesive core layer, the microbubbles should comprise at least 5% by volume of the core layer for the tape to be foamlike.

A tape similar to that of U.S. Pat. No. 4,223,067 can be produced by the steps of (1) mixing together photopolymerizable monomers, microbubbles of an average density not exceeding 1.0 g/cc, and pigment in an amount that would not unduly inhibit polymerization of the monomers by ultraviolet radiation, (2) coating the mixture onto a backing sheet, (3) subjecting the coating to ultraviolet radiation to photopolymerize the monomers to provide a pastel, microbubble-filled pressure-sensitive adhesive core layer, and (4) laminating to the exposed surface of the core layer a relatively thin, dense surface layer of pigmented pressure-sensitive adhesive which is substantially free from microbubbles, thus providing a composite tape of the invention having two pressure-sensitive adhesive layers. An identical tape can be made by applying the coating of step (2) onto a relatively thin, dense, microbubble-free layer of pigmented pressure-sensitive adhesive that is releasably adhered to the backing sheet, and omitting step (4). This 2-layer composite pressure-sensitive adhesive tape can be converted to a 3-layer composite by then carrying out step (4) of the above-outlined process. The 3-layer composite tape can appear to be intensely colored from both faces and surprisingly well colored when viewed on edge. Preferably, the core layers of these 2-layer and 3-layer composite adhesives have thicknesses from 0.25 to 1.5 mm (typically about 1.0 mm) while their surface layers are from 0.0125 to 0.25 mm (typically about 0.03 mm) in thickness.

Preferably the backing sheet used in step (2) has a low-adhesion surface to permit the novel pressure-sensitive adhesive composite to be used for such purposes as adhering body-side moldings to automotive vehicles.

While carbon black is preferred when a black color is desired, pigments or dyes of any color should be useful in making tapes of the invention.

The thin, dense, microbubble-free surface layer or layers of a composite tape of the invention can be photopolymerized or can be polymerized from solution or emulsion, but its core layer preferably is photopolymerized. If desired, the composite tape can be prepared by simultaneously photopolymerizing the core layer and the thin, dense microbubble-free surface layer, thereby simplifying processing and reducing cost.

All pressure-sensitive adhesive layers of the novel tape preferably comprise an "acrylic pressure-sensitive adhesive" which comprises at least one copolymer of monomers comprising (a) a major proportion of acrylic acid ester of nontertiary alkyl alcohol, the molecules of which have from 1 to 14 carbon atoms, and (b) a minor proportion of at least one copolymerizable monomer having a polar group. When at least a major proportion of said molecules have a carbon-to-carbon chain of 4–12 carbon atoms terminating at the hydroxyl oxygen atom and said chain contains at least about one-half the total number of carbon atoms in the molecule, the copolymer is tacky at ordinary room temperature, as disclosed in U.S. Pat. No. Re. 24,906. However, the term "acrylic pressure-sensitive adhesive" also encompasses adhesives which are not tacky at room temperatures but become tacky only at elevated temperatures, e.g., acrylic copolymers as described above except that a major proportion of the molecules of monomer (a) have a carbon-to-carbon chain substantially shorter than 4 carbon atoms. The substitution of a methacrylic acid ester for a significant portion of monomer (a) can produce the same result.

Suitable copolymerizable monomers having a polar group include acrylic acid, methacrylic acid, itaconic acid, maleic anhydride, acrylamide, and N-vinyl-2-pyrrolidone. Of these copolymerizable monomers, those having carboxyl groups provide superior cohesive strength and also excellent adhesion to metallic surfaces, but not nearly as good adhesion to low-energy surfaces as does N-vinyl-2-pyrrolidone, as is taught in U.S. Pat. No. 4,364,972.

When one surface layer of a 3-layer pressure-sensitive adhesive composite of the invention comprises a copolymer of acrylic acid ester and a carboxyl-containing monomer and the other surface layer comprises a copolymer of acrylic acid esters and N-vinyl-2-pyrrolidone monomer, the latter layer of the composite forms strong bonds to low-energy surfaces and the former layer forms strong bonds to high-energy surfaces. When either a 2-layer or 3-layer composite is formed by simultaneously photopolymerizing two or three coatings of such monomer mixtures, it is impossible to delaminate the resulting pressure-sensitive adhesive.

The following tests may be used to evaluate tapes of the invention.

Static Shear Value at 70° C.

A strip of tape 1.27 cm in width is adhered by its adhesive to a flat, rigid stainless steel plate with an exactly 1.27-cm length of tape in contact with the panel. Before testing, a 1000-g weight rests over the bonded area for 15 minutes. Then the panel with the adhered tape is placed in an air-circulating oven which has been preheated to 70° C., and after 15 minutes, a 500-g weight is hung from the free end of the tape, with the panel tilted 2° from the vertical to insure against the exertion of any peel forces. The time at which the weight falls is the "Static Shear Value at 70° C.". If no failure has occurred, the test is discontinued at 10,000 minutes.

T-Peel

T-peel is measured as in ASTM D-1876-72 except that the test tapes were 1.27-cm in width and were tested only two hours after being adhered to aluminum foil backings. Results are reported in Newtons per decimeter (N/dm). Only cohesive failures are reported.

T-peel provides a quantitative value of cohesive strength and is less sensitive to differences in the adhesion of the pressure-sensitive adhesive to the test surface.

180° Peel

The adhesive layer to be tested is slit to a width of 1.27-cm and is self-adhered to a clean smooth stainless steel plate. A 1.27-cm wide strip of pressure-sensitive adhesive on a nonstretchable backing is laid onto the adhesive layer to be tested. This composite is subjected to the weight of a 5.58-kg hard rubber-covered steel roller, 3 passes in each direction. After dwelling at 23° C. for one hour (or 72 hours where indicated), the "180° Peel" is measured by measuring the force required to move the free end of the tape away from the steel plate at a rate of about 0.5 cm per second.

Darkness

The darkness of a pressure-sensitive adhesive layer is determined on a Hunter LabScan Spectrocolorimeter using a 10° reflectance, Illum=D65 and the CIE lab scale (L* a* b*) where L*=0 for black and L*=100 for white. Since a* and b* for black samples are usually between −5 and +5, they are not reported unless one of them is outside of that range.

Pigments

The carbon black pigment used in the following examples was 27% solids dispersed in phenoxyethylacrylate and was a mixture of two carbon blacks, average diameters of 27 and 62 nm.

The red pigment was a 15% dispersion of quinacridone violet in isobornyl acrylate.

The blue pigment was "LB Suncure" blue base (Sun Chemical).

In the following examples, parts are given by weight. The glass microbubbles used in Examples 1-5, 7 and 8 had a true density of 0.15 g/cm$^3$ and were 20-150 μm in diameter (average 55 μm).

EXAMPLE 1

A syrup of coatable viscosity was prepared by partially photopolymerizing, as taught in U.S. Pat. No. 4,330,590, a mixture of 87.5 parts isooctyl acrylate, 12.5 parts acrylic acid, and 0.04 part of 2,2-dimethyl-2-phenyl acetophenone ("Irgacure" 651). To this syrup was added an additional 1 part of "Irgacure" 651, 0.05 part of hexanedioldiacrylate, 7 parts of glass microbubbles, and 0.043 part of carbon black (added as 0.16 part of dispersion). The resulting mixture was thoroughly and slowly mixed with an air stirrer and carefully degassed in a desiccator using a vacuum pump. The glass microbubbles comprised about 33% by volume of the mixture.

The mixture was fed into the nip of a knife coater between a pair of transparent, biaxially oriented poly(ethylene terephthalate) films, the facing surfaces of which had low-adhesion coatings. The knife coater was adjusted to provide a coating thickness of approximately 1.0 to 1.2 mm. The composite emerging from the knife coater was irradiated with a bank of fluorescent lamps, 90% of the emissions of which were between 300 and 400 nm with a maximum at 351 nm. The exposure was measured by a Dynachem Radiometer, which is spectrally responsive between 300 and 400 nm, maximum 350 nm. Each side of the coating was exposed to a total radiation of 400-410 mj. This total does not include the irradiation adsorbed by the poly(ethylene terephthalate) films. The composite was cooled by blowing air against both films during the irradiation to keep the temperature of the film below 85° C. to avoid wrinkling of the films. The resulting microbubble-filled pressure-sensitive layer (here called "the core layer") was pastel grey in color.

A relatively thin, dense, pigmented pressure-sensitive adhesive layer which was free from microbubbles was prepared using an air stirrer to disperse carbon black into a 17% solution in toluene-ethyl acetate of a copolymer of 90 parts isooctyl acrylate and 10 parts acrylic acid (0.59 part of carbon black per 100 parts copolymer). A crosslinking agent was then added to improve the internal strength. The mixture was coated 0.3 mm thick using a conventional knife coater onto a paper backing, the surface of which had a low-adhesion coating. The solvent was removed by heating the coated film in an oven at 70° C. for 10 minutes. The resulting dried, dense, microbubble-free pigmented pressure-sensitive adhesive layer (here called "the surface layer") was translucent and appeared grey on its white paper backing. It was 0.05 mm in thickness. The core layer was laminated to the surface layer to provide a composite pressure-sensitive tape of Example 1, here called "Tape 1".

Tape 1 was used to mount onto glass plate a black strip of plastic simulating automotive body side molding. For comparison, another black strip was mounted onto the plate using a composite tape (Comparative Tape "1C") made in the same way as Tape 1 except omitting the carbon black from the surface layer. The face of Tape 1 when viewed through the glass was black, while that of Tape 1C was grey. When viewed edgewise, Tape 1C was grey while Tape 1 was appreciably darker and virtually blended into the black of the plastic strip.

EXAMPLE 2

Tape 2 was made in the same way as was Tape 1 except that in making the surface layer, the amount of carbon black was reduced to 0.054 part per 100 parts copolymer to provide in both the core and surface layers the same proportion of pigment relative to the amount of pressure-sensitive adhesive.

EXAMPLE 3

Composite pressure-sensitive adhesive Tape 3 was made in the same way as was Tape 1 except that carbon black was omitted in making the core layer.

EXAMPLES 4 and 5

Each of composite pressure-sensitive adhesive Tapes 4 and 5 was made in the same way as was Tape 1 except as follows. In making the core layers the carbon black was replaced by:

0.14 part red pigment in the core of Tape 4,
0.167 part blue pigment in the core of Tape 5.

The relatively thin, dense, microbubble-free pigmented surface layers of the two tapes were prepared from a partially polymerized syrup of 87.5 parts isooctyl acrylate and 12.5 parts acrylic acid to which had been added 0.1 part of "Irgacure" 651, 0.05 part of hexanediol diacrylate and pigment as follows:

0.025 part red pigment in the surface layer of Tape 4,
0.028 part blue pigment in the surface layer of Tape 5.

After stirring with an air stirrer, each mixture was coated between biaxially oriented poly(ethylene terephthalate) films, the facing surfaces of which had a low-adhesion coating, and then irradiated with lamps as described in Example 1. The thickness of each of the resulting pressure-sensitive adhesive surface layers was 0.25 mm. The thickness of each of the core layers was 1.0 mm.

The colors of the core and surface layers alone were:

| Tape 4 | |
|---|---|
| Core layer | pastel violet |
| Surface layer | translucent pastel violet |
| Tape 5 | |
| Core layer | pale pastel blue |
| Surface layer | translucent deeper blue |

The color of the surface layer of the composite Tape 4 was much deeper and more vivid and intense than the color of either the core layer or the surface layer alone. The color of the surface layer of the composite Tape 5 was much deeper and more intense than that of the core layer alone and somewhat deeper and more intense than that of the surface layer alone.

EXAMPLE 6

Composite pressure-sensitive adhesive Tape 6 was prepared in the same way as was Tape 1, except that only 0.035 part of carbon black was used in the core layer, and 0.059 part of carbon black, in the surface layer. Also, the glass microbubbles were replaced by polymeric microbubbles made from a copolymer of vinylidene chloride and acrylonitrile, "Miralite" 177 from Pierce & Stevens Chemical Corp. The polymeric microbubbles had a true density of 0.036 g/cm$^3$ and were 10-60 μm in diameter (average 30 μm). In order to obtain 33% volume of the microbubbles in the core layer, 1.93 parts of the polymeric microbubbles were employed per 100 parts of the syrup.

Testing

Tapes 1-6 were tested in comparison to tapes, called 1C, and 3C through 6C, respectively, which were identical except for omitting the pigment from the surface layer. Test results are reported in Table I.

TABLE I

| TAPES | COLOR | DARKNESS L* | a* | b* | T-PEEL (N/dm) | 180° PEEL (N/dm) |
|---|---|---|---|---|---|---|
| 1 | BLACK | 19 | — | — | 360 | 187 |
| 1C | GREY | 51 | — | — | 360 | 200 |
| 2 | DARK GREY | 30 | — | — | NT | NT |
| 3 | BLACK | 27 | — | — | 344 | 185 |
| 3C | WHITE | 92 | — | — | 344 | 174 |
| 4 | VIOLET | 31 | 46 | −2 | 370 | 231 |
| 4C | VIOLET | 42 | 34 | −7 | 370 | 214 |
| 5 | BLUE | 26 | 14 | −46 | 418 | 213 |
| 5C | LIGHT BLUE | 47 | −0.5 | −33 | 383 | 240 |
| 6 | BLACK | 17 | — | — | 248 | 163 |
| 6C | GREY | 54 | — | — | 248 | 153 |

NT = not tested
Each of the 14 tapes of Table I had a Static Shear Value at 70° C. of greater than 10,000 minutes.

EXAMPLE 7

Using a conventional knife coater onto a biaxially oriented poly(ethylene terephthalate) film backing was coated a mixture of a partially polymerized syrup of 90 parts isooctyl acrylate and 10 parts acrylic acid, plus 0.1 part of "Irgacure" 651, 0.15 photoactive s-triazine B of U.S. Pat. No. 4,330,590, and 1.0 part carbon black. Between this microbubble-free coating and an identical film backing was applied, using a roll coater, a microbubble-filled syrup identical to that used in making the core layer of Tape 1 except that the amount of carbon black was increased to 0.08 part and the syrup included 4 parts of hydrophobic silica ("Aerosil" 972 from Degussa). The thicknesses of the two coatings were 0.025 and 0.875 mm, respectively. The two coatings were simultaneously photopolymerized as in Example 1 to provide a composite pressure-sensitive adhesive tape of the invention. Its T-Peel was 328 N/dm. Its microbubble-free face was black and had an L*=12 and 180° Peel of 209 N/dm; its microbubble-filled face was dark grey and had an L*=33 and a 180° Peel of 180 N/dm.

EXAMPLE 8

Pressure-sensitive adhesive tape was made from a syrup prepared by partially polymerizing a mixture of 90 parts of isooctyl acrylate, 10 parts of acrylic acid, and 0.04 part of "Irgacure" 651. After adding 0.043 part of carbon black and 7 parts glass microbubbles, the mixture was employed to provide a cellular pressure-sensitive adhesive membrane as described in U.S. Pat. No. 4,415,615, Typical Tape Making Procedure, column 6, line 31. A 2:1 blend of surfactants C and D described in U.S. Pat. No. 4,415,615 was used to froth the syrup, which was then coated and photopolymerized as described in Example 1 above to provide a cellular pressure-sensitive adhesive membrane having a thickness of 1.0 mm.

To this cellular membrane was laminated a length of the 0.05 mm thick, microbubble-free, pressure-sensitive adhesive surface layer used in Example 1. Testing of the resulting composite is in Table II.

TABLE II

| | Color | Darkness L* | 180° Peel (N/dm) | T-Peel (N/dm) |
|---|---|---|---|---|
| Cellular Layer | Light Grey | 49 | 142 | 196 |
| Surface Layer | Black | 20 | 153 | |

I claim:

1. Composite pressure-sensitive adhesive tape comprising a pigmented microbubble-filled or cellular pressure-sensitive adhesive core layer to which is adhered a relatively thin, dense surface layer of pigmented pressure-sensitive adhesive that is substantially free of microbubbles wherein the surface layer of the composite tape appears more intense in color than does the face of either layer alone.

2. Pressure-sensitive adhesive tape as defined in claim 1 wherein each of said core and surface layers contains a black pigment and by itself is grey in color, and the surface layer of the composite tape appears black.

3. Pressure-sensitive adhesive tape as defined in claim 1 having a relatively thin, dense, pigmented surface layer covering both faces of said core layer.

4. Pressure-sensitive adhesive tape as defined in claim 1 wherein the core layer comprises at least 90% of the thickness of said pressure-sensitive adhesive composite.

5. Pressure-sensitive adhesive tape as defined in claim 4 having a flexible backing sheet which has a low-adhesion surface from which said pressure-sensitive adhesive composite is readily removable.

6. Pressure-sensitive adhesive tape as defined in claim 5 wherein the uncoated face of the backing sheet has a low-adhesion surface, and the tape is wound upon itself in roll form.

7. Pressure-sensitive adhesive tape as defined in claim 1 wherein glass microbubbles comprise from 25 to 55 volume percent of the core layer.

8. Method of making a composite pressure-sensitive adhesive tape comprising the steps of (1) mixing together photopolymerizable monomers, microbubbles of an average density not exceeding 1.0 g/cc, and pigment in an amount that would not unduly inhibit polymerization of the monomers by ultraviolet radiation, (2) coating the mixture onto a backing sheet to a thickness of at least 0.25 mm, (3) subjecting the coating to ultraviolet radiation to photopolymerize the monomers to a pressure-sensitive adhesive state, and (4) laminating to the exposed surface of the resulting microbubble-filled pressure-sensitive adhesive layer a dense, pigmented pressure-sensitive adhesive layer which is less than 0.125 mm in thickness.

9. Method as defined in claim 8 wherein the face of the backing sheet onto which the microbubble-filled mixture is coated has a low-adhesion surface bearing a second dense, pigmented pressure-sensitive adhesive layer which is less than 0.125 mm in thickness.

10. Method as defined in claim 8 wherein the uncoated face of the backing sheet has low-adhesion surface, and step (4) is followed by the step of winding the composite tape with its backing sheet into roll form for convenient storage and shipment.

11. Method as defined in claim 8 wherein the dense, pigmented pressure-sensitive adhesive layer has been coated from solution or emulsion.

12. Method as defined in claim 8 wherein said dense, pigmented pressure-sensitive adhesive layer has been photopolymerized.

13. The method of making a composite pressure-sensitive adhesive tape comprising the steps of (1) mixing together photopolymerizable monomers and pigment in an amount that would not unduly inhibit polymerization of the monomers by ultraviolet radiation, (2) coating the mixture onto a backing sheet to a thickness of at least 0.0125 mm, (3) mixing together photopolymerizable monomers, microbubbles of an average density not exceeding 1.0 g/cc, and pigment in an amount that would not unduly inhibit polymerization of the monomers by ultraviolet radiation, (4) coating the mixture of step 3 onto the layer prepared in step 2, and (5) subjecting the two coatings to ultraviolet radiation to photopolymerize the monomers to a pressure-sensitive adhesive state.

* * * * *